Figure 1:
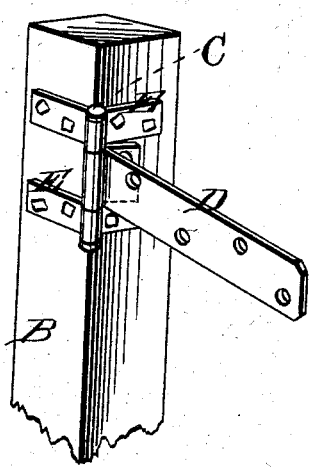
Figure 2:
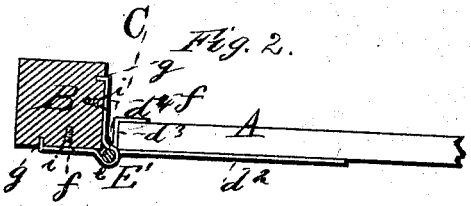
Figure 3:
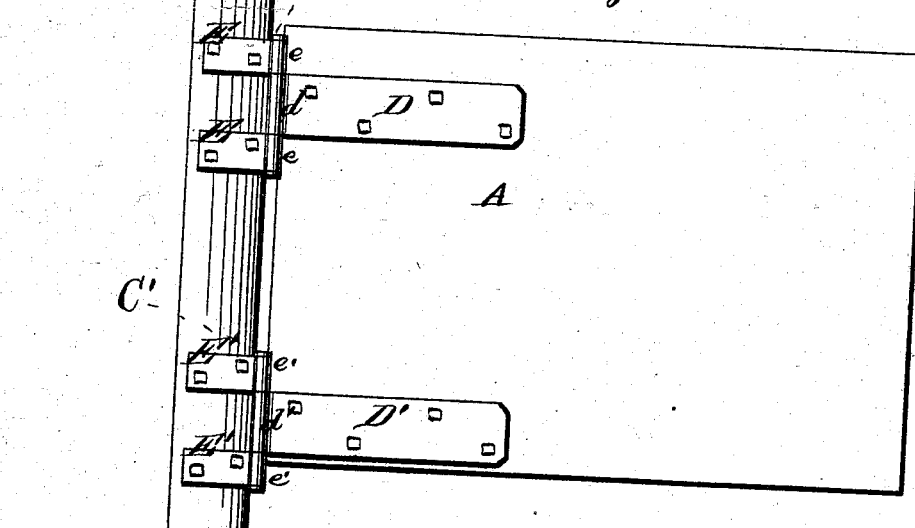
Figure 1:
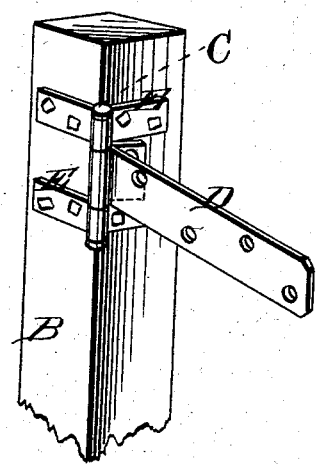
Figure 2:
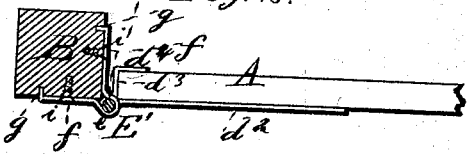
Figure 3:
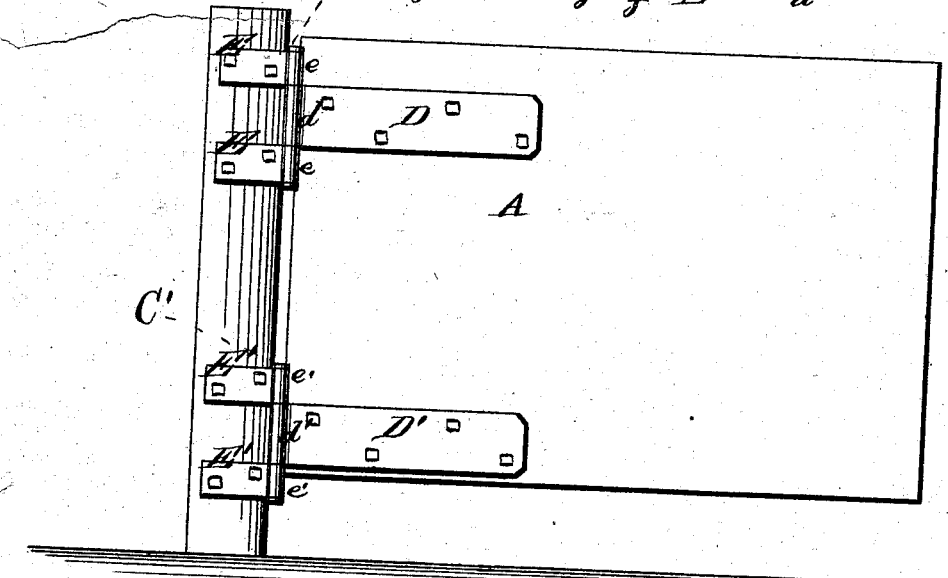

D. W. LONG.
HINGES.

No. 189,866. Patented April , 1877.

WITNESSES
Robert Everitt
George B. Upham

INVENTOR
David W. Long.
Gilmore, Smith & Co.
ATTORNEYS

D. W. LONG.
HINGES.

No. 189,866.

Patented April , 1877.

WITNESSES

INVENTOR
David W. Long.
Gilmore, Smith & Co.
ATTORNEYS